(12) United States Patent
Nakagawa et al.

(10) Patent No.: US 11,280,298 B2
(45) Date of Patent: Mar. 22, 2022

(54) EVAPORATED FUEL PROCESSING DEVICE (71) Applicant: AISAN KOGYO KABUSHIKI KAISHA, Obu (JP)

(72) Inventors: Makoto Nakagawa, Nagoya (JP); Takahiro Seko, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/257,889

(22) PCT Filed: May 29, 2019

(86) PCT No.: PCT/JP2019/021294
§ 371 (c)(1),
(2) Date: Jan. 5, 2021

(87) PCT Pub. No.: WO2020/021846
PCT Pub. Date: Jan. 30, 2020

(65) Prior Publication Data
US 2021/0270215 A1  Sep. 2, 2021

(30) Foreign Application Priority Data
Jul. 23, 2018 (JP) .............................. JP2018-137739

(51) Int. Cl.
*F02M 25/08* (2006.01)
*B01D 53/04* (2006.01)
(Continued)

(52) U.S. Cl.
CPC ......... *F02M 25/0836* (2013.01); *B01D 53/04* (2013.01); *F02D 41/0032* (2013.01);
(Continued)

(58) Field of Classification Search
CPC ........... F02M 25/0836; F02M 25/0872; F02M 35/10222; F02D 41/0032; F02D 41/0045
(Continued)

(56) References Cited

U.S. PATENT DOCUMENTS

2005/0211228 A1  9/2005  Amano et al.
2006/0042605 A1  3/2006  Amano et al.
(Continued)

FOREIGN PATENT DOCUMENTS

JP  2006-161795 A  6/2006
JP  2008-291916 A  12/2008
(Continued)

OTHER PUBLICATIONS

Aug. 13, 2019 International Search Report issued in International Patent Application No. PCT/JP2019/021294.
(Continued)

*Primary Examiner* — Mahmoud Gimie
(74) *Attorney, Agent, or Firm* — Oliff PLC (57) ABSTRACT

An evaporative fuel processing device includes a canister, a purge path connected to the canister and an intake path that is connected to an internal combustion engine and through which purge gas flows from the canister to the intake path, and a flow control valve provided in the purge path to control the flow rate of the purge gas, wherein: the device further includes a first pressure detection unit that detects a first pressure at a first position between the canister and the flow control vale, and a concentration estimation unit that estimates a purge concentration of the purge gas flowing in the purge path; and the concentration estimation unit determines an increase in the first pressure generated by closing the flow control valve based on the detection value from the
(Continued)

first pressure detection unit, and estimates the purge concentration based on the determined increase in the first pressure.

16 Claims, 5 Drawing Sheets

(51) Int. Cl.
*F02D 41/00* (2006.01)
*F02M 35/10* (2006.01)

(52) U.S. Cl.
CPC ..... *F02D 41/0045* (2013.01); *F02M 25/0872* (2013.01); *F02M 35/10222* (2013.01); *B01D 2259/4516* (2013.01)

(58) Field of Classification Search
USPC ........................................................ 123/519
See application file for complete search history.

(56) References Cited

U.S. PATENT DOCUMENTS

| | | |
|---|---|---|
| 2008/0290306 A1 | 11/2008 | Okuda |
| 2013/0213366 A1* | 8/2013 | Weigl ................... F02M 25/089 123/520 |
| 2017/0159588 A1* | 6/2017 | Honjo ................... F02D 41/263 |
| 2019/0285011 A1 | 9/2019 | Asanuma |

FOREIGN PATENT DOCUMENTS

| | | |
|---|---|---|
| JP | 2017-106334 A | 6/2017 |
| JP | 2017-214836 A | 12/2017 |
| JP | 2018-17184 A | 2/2018 |

OTHER PUBLICATIONS

Jan. 26, 2021 International Preliminary Report on Patentability issued in International Patent Application No. PCT/JP2019/021294.

\* cited by examiner

EVAPORATED FUEL PROCESSING DEVICE

CROSS-REFERENCE TO RELATED APPLICATIONS

This is a US national phase application based on the PCT International Patent Application No. PCT/JP2019/021294 filed on May 29, 2019, and claiming the priority of Japanese Patent Application No. 2018-137739, filed on Jul. 23, 2018, the entire contents of which are herewith incorporated by reference.

TECHNICAL FIELD

The present disclosure relates to an evaporated fuel processing device for supplying an evaporated fuel generated in a fuel tank to an internal combustion engine through an intake passage.

BACKGROUND ART

In an apparatus of the Patent Document 1, a measurement passage connected to a purge passage is provided via a branch passage, and an aperture is provided on the way of the measurement passage. The apparatus can perform measurement of vapor concentration of a fuel even during purge control by calculating the concentration based on a pressure difference on both ends of the aperture while air flows through the measurement passage and on a pressure difference on both ends of the aperture when air mixture flows through the measurement passage from a canister.

RELATED ART DOCUMENTS

Patent Documents

Patent Document 1: JP2006-161795A

SUMMARY OF INVENTION

Problems to be Solved by the Invention

However, the apparatus of the Patent Document 1 is provided with the measurement passage provided separately from the purge passage but connected to the purge passage via the branch passage for measuring the vapor concentration of the fuel (purge concentration). This configuration leads to complication in the apparatus and anxiety in striking increase in cost that is accompanied by the complicated configuration.

To address this, the present disclosure has been made to solve the above problem, and has a purpose of providing an evaporated fuel processing device achieving detection of purge concentration even during purge control with a simple device configuration.

Means of Solving the Problems

One aspect of the present disclosure to solve the above problem is to provide an evaporated fuel processing device comprising: a canister; a purge passage connected to an intake passage that is connected with an internal combustion engine and to the canister to make purge gas flow from the canister to the intake passage; and a flow rate control valve provided in the purge passage to control a flow rate of the purge gas, wherein the evaporated fuel processing device further comprises: a first pressure detection section configured to detect a first pressure as a pressure at a first position between the canister and the flow rate control valve in the purge passage; and a concentration estimation section configured to estimate the purge concentration as a concentration of the purge gas flowing through the purge passage, and the concentration estimation section is configured to: obtain an increase value of the first pressure generated by valve-closing operation of the flow rate control valve based on a detected value of the first pressure detection section, and estimate the purge concentration based on the obtained increase value of the first pressure.

According to the above aspect, the pressure in the purge passage is increased by the valve-closing operation of the flow rate control valve to estimate the purge concentration based on the increased value of the pressure. Accordingly, for estimating the purge concentration, the first pressure detection section has only to be added in the purge passage as a constituent component necessary for the evaporated fuel processing device. Therefore, according to the evaporated fuel processing device of the present aspect, detection of the purge concentration can be performed even during the purge control with a simple configuration, and thus cost reduction can be achieved.

In the above aspect, preferably, the flow rate control valve is configured to be operated to close to generate a pressure wave in the purge passage so that the first pressure is increased during execution of purge control of introducing the purge gas from the canister to the intake passage via the purge passage.

According to the above aspect, the pressure wave is generated in the purge passage, and thus the pressure at the first position of the purge passage is remarkably increased. An estimation accuracy of the purge concentration is thereby improved.

In the above aspect, preferably, the concentration estimation section is configured to estimate the purge concentration with making a correction considering at least any one of a valve-closing speed of the flow rate control valve and an attenuation amount of the pressure wave generated in the purge passage by the valve-closing operation of the flow rate control valve while the pressure wave is propagated from the flow rate control valve to the first pressure detection section.

According to the above aspect, the purge concentration can be estimated according to the characteristics of the flow rate control valve that is actually provided in the evaporated fuel processing device and the characteristics of a pipe constituting the purge passage. Accordingly, in estimating the purge concentration, the device is hardly influenced by individual differences of the flow rate control valves and the pipes. Therefore, the estimation accuracy of the purge concentration is improved.

In the above aspect, preferably, the evaporated fuel processing device comprises a second pressure detection section configured to detect a second pressure as a pressure at a second position in the purge passage on a side closer to the canister than the first position, wherein the concentration estimation section is configured to: calculate a pressure-wave propagation speed as a speed of propagating the pressure wave generated in the purge passage by the valve-closing operation of the flow rate control valve based on a period of time from detection of increase in the first pressure by the first pressure detection section to detection of increase in the second pressure by the second pressure detection section during the valve-closing operation of the flow rate control valve; and estimate the purge concentration based on an increase value of the first pressure and the calculated pressure-wave propagation speed.

According to the above aspect, the purge concentration is estimated by use of the pressure-wave propagation speed that is calculated based on pressure values (actual measured values) actually detected by the first pressure detection section and the second pressure detection section, and thus, the estimation accuracy of the purge concentration is further improved.

In the above aspect, preferably, a period of time from start to termination of the valve-closing operation of the flow rate control valve is made to be shorter than a period of time of the pressure wave generated in the purge passage by the valve-closing operation of the flow rate control valve to be propagated from the flow rate control valve to the canister and reflect on the canister to reach the flow rate control valve.

According to the above aspect, accelerating the valve-closing speed of the flow rate control valve prevents decline in the pressure increase in the purge passage that is caused by the pressure wave reflecting on the canister and reaching back to the flow rate control valve before full-valve-closing of the flow rate control valve. Therefore, the estimation accuracy of the purge concentration is further effectively improved.

In the above aspect, preferably, a passage sectional area of the purge passage from the canister to the flow rate control valve is formed uniform.

According to the above aspect, it is possible to restrain the pressure wave generated in the purge passage by the valve-closing operation of the flow rate control valve from attenuating during propagation in the purge passage and from reflecting on any parts other than the canister as much as possible. Therefore, the estimation accuracy of the purge concentration is further effectively improved.

In the above aspect, preferably, a purge pump is provided to control flow of the purge gas at a position in the purge passage between the canister and the first pressure detection section.

According to the above aspect, the pressure increase in the purge passage can be made stably large by driving of the purge pump. Therefore, the purge concentration can be estimated with the large pressure increase in the purge passage, thus further improving the estimation accuracy of the purge concentration.

Effects of the Invention

According to an evaporated fuel processing device of the present disclosure, purge concentration can be detected by a simple device configuration even during purge control.

MODE FOR CARRYING OUT THE INVENTION

A detailed description of an embodiment embodying an evaporated fuel processing device of the present disclosure is explained below.

First Embodiment

A first embodiment of an evaporated fuel processing device 1 is now explained.

<Overview of Evaporated Fuel Processing Device>

An overview of the evaporated duel processing device 1 of the present embodiment is explained first. The evaporated fuel processing device 1 is mounted on a vehicle such as an automobile.

Figure 1:
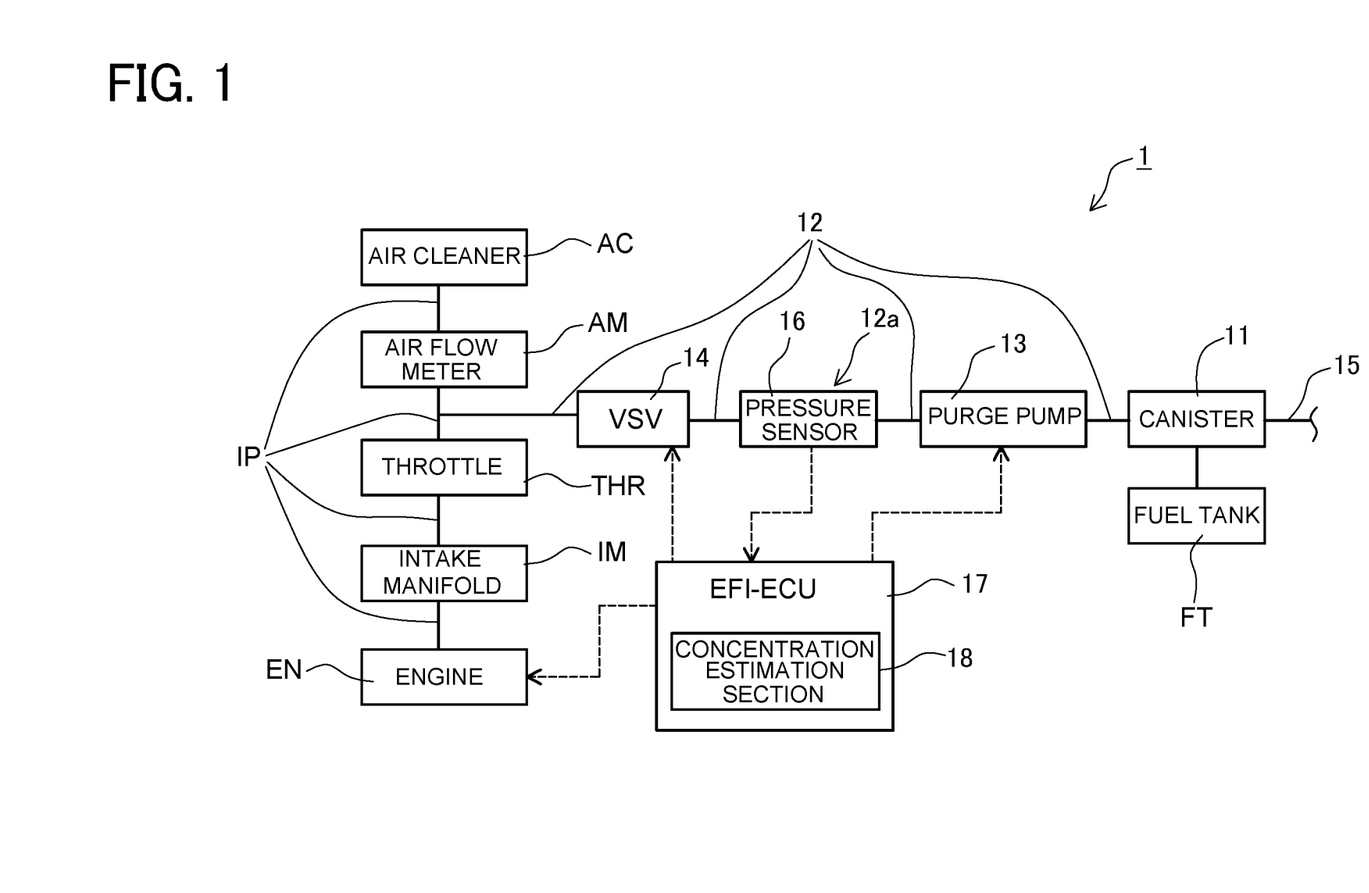
FIG. 1 is a schematic configurational view of an evaporated fuel processing device and its surroundings in a first embodiment.

As shown in FIG. 1, an engine EN (an internal combustion engine) mounted on a vehicle is connected to an intake passage IP for supplying air (intake air) to the engine EN. The intake passage IP is provided with an intake manifold IM and a throttle (a throttle valve) THR to control an air amount (an intake air amount) of the air flowing into the engine EN by opening and closing operation of the intake passage IP. An air cleaner AC to remove foreign matters from the air flowing into the intake passage IP is provided on an upstream side of the throttle THR in the intake passage IP (on an upstream side of a flow direction of the intake air). By this configuration, the air passes through the air cleaner AC in the intake passage IP and is taken into the engine EN. Further, in a vicinity of the air cleaner AC in the intake passage IP, namely on an upstream side of connecting portions of a purge passage 12 with the intake passage IP, which will be described later, an air flow meter AM to detect an air amount (an intake air amount) of the air flowing into the engine EN is provided.

The evaporated fuel processing device 1 of the present embodiment is a device for supplying an evaporated fuel in a fuel tank FT to the engine EN via the intake passage IP. As shown in FIG. 1, the evaporated fuel processing device 1 includes a canister 11, the purge passage 12, a purge pump 13, a VSV 14 (a purge valve or a flow rate control valve), an atmosphere passage 15, a pressure sensor 16 (a first pressure detection section), an EFI-ECU 17 (a controller) (hereinafter, referred as an "ECU 17"), and others.

The canister 11 is connected to the fuel tank FT to adsorb the evaporated fuel which has flown from the fuel tank FT. Further, the canister 11 is communicated with the purge passage 12 and the atmosphere passage 15.

The purge passage 12 is connected with the intake passage IP and the canister 11. In the present embodiment, the purge passage 12 is communicated with the intake passage IP upstream of the throttle THR. Thus, purge gas (gas including the evaporated fuel) having flown out of the canister 11 further flows through the purge passage 12 and is introduced in the intake passage IP.

The purge pump 13 is provided in the purge passage 12 between the canister 11 and the pressure sensor 16 (or the VSV 14). This purge pump 13 controls flow of the purge gas flowing through the purge passage 12. Specifically, the purge pump 13 feeds the purge gas in the canister 11 to the purge passage 12 and supplies the purge gas having been fed to the purge passage 12 to the intake passage IP.

The VSV 14 is provided in the purge passage 12 on a downstream side of the purge pump 13 (a downstream side of a flow direction of the purge gas), namely, between the purge pump 13 (the pressure sensor 16) and the intake passage IP. The VSV 14 controls a flow rate of the purge gas flowing through the purge passage 12. To be specific, during valve closing of the VSV 14 (in a valve-closing state), the purge gas in the purge passage 12 is halted its flow by the VSV 14 and disallowed to flow to the intake passage IP. On the other hand, during valve opening of the VSV 14 (in a valve-open state), the purge gas flows into the intake passage IP.

The atmosphere passage 15 has one end opening in the atmosphere and the other end connected to the canister 11 so that the canister 11 is communicated with the atmosphere. The air taken in from the atmosphere thus flows in the atmosphere passage 15.

The pressure sensor 16 is provided in a position between the canister 11 and the VSV 14 in the purge passage 12, specifically, provided in a first position 12a between the purge pump 13 and the VSV 14. Thus, the pressure sensor 16 is provided in a vicinity of the VSV 14. The pressure sensor 16 detects a pressure (a first pressure) in a position between the purge pump 13 and the VSV 14.

The ECU 17 includes a CPU and memories such as an ROM and an RAM. The ECU 17 controls the engine EN, the throttle THR, and others according to programs stored in advance in the memories. Further, the ECU 17 obtains detected values detected by the air flow meter AM.

Further, the ECU 17 controls the evaporated fuel processing device 1 according to programs stored in advance in the memories. For example, the ECU 17 controls the purge pump 13 and the VSV 14. When the ECU 17 controls the VSV 14, the ECU 17 carries out duty control, for example. In other words, the ECU 17 adjusts a valve-opening time of the VSV 14 by adjusting a duty ratio of signals output to the VSV 14, for example. Further, the ECU 17 obtains a detected value of the pressure at the first position 12a in the purge passage 12 by the pressure sensor 16.

In the present embodiment, the ECU 17 is provided with a concentration estimation section 18 to estimate a purge concentration as a concentration of the evaporated fuel (containing hydrocarbon such as butane) included in the purge gas flowing through the purge passage 12. A method of estimating the purge concentration by the concentration estimation section 18 will be explained below.

In the evaporated fuel processing device 1 having the above-mentioned configuration, when a purge condition is satisfied during operation of the engine EN, the ECU 17 carries out the purge control by controlling the purge pump 13 and the VSV 14. The "purge control" represents control of introducing the purge gas from the canister 11 to the intake passage IP via the purge passage 12.

While the purge control is being carried out, the engine EN is supplied with the air taken into the intake passage IP, the fuel injected from the fuel tank FT via an injector (not shown), and the purge gas introduced in the intake passage IP by the purge control. Then, the ECU 17 adjusts injection time of the injector and the duty ratio of the VSV 14 to adjust an air-fuel ratio (A/F) of the engine EN to an optimum air-fuel ratio (such as an ideal air-fuel ratio).

<Method of Estimating Purge Concentration>

The following explanation is to explain a method of estimating a purge concentration performed by the ECU 17 (the concentration estimation section 18) in the evaporated fuel processing device 1 having the above-mentioned configuration.

In the present embodiment, the concentration estimation section 18 of the ECU 17 estimates the purge concentration based on a pressure detected by the pressure sensor 16. Specifically, the concentration estimation section 18 obtains a pressure increase allowance (a pressure difference) by an inertial effect caused by valve opening and closing operation of the VSV valve 14 based on a detected value of the pressure sensor 16, and then calculates the purge concentration by a relational expression described below based on the obtained pressure increase allowance.

To be more specific, based on the detected value of the pressure sensor 16, the concentration estimation section 18 obtains the pressure increase value at the first position 12a increased by a pressure wave PW that is generated in the purge passage 12 by the valve closing operation of the VSV 14 and then estimates the purge concentration by the relational expression described below based on the obtained pressure increase value. Herein, the "valve closing operation of the VSV 14" means operation of shifting the VSV 14 from its valve-open state to the valve-closed state. The "pressure wave PW" represents a pulsatory motion of the pressure generated by inertia of the purge gas flowing through the purge passage 12 when the flow of the purge gas is abruptly shut off by the valve-closing operation of the VSV 14 in the purge passage 12.

First Example

Figure 2:
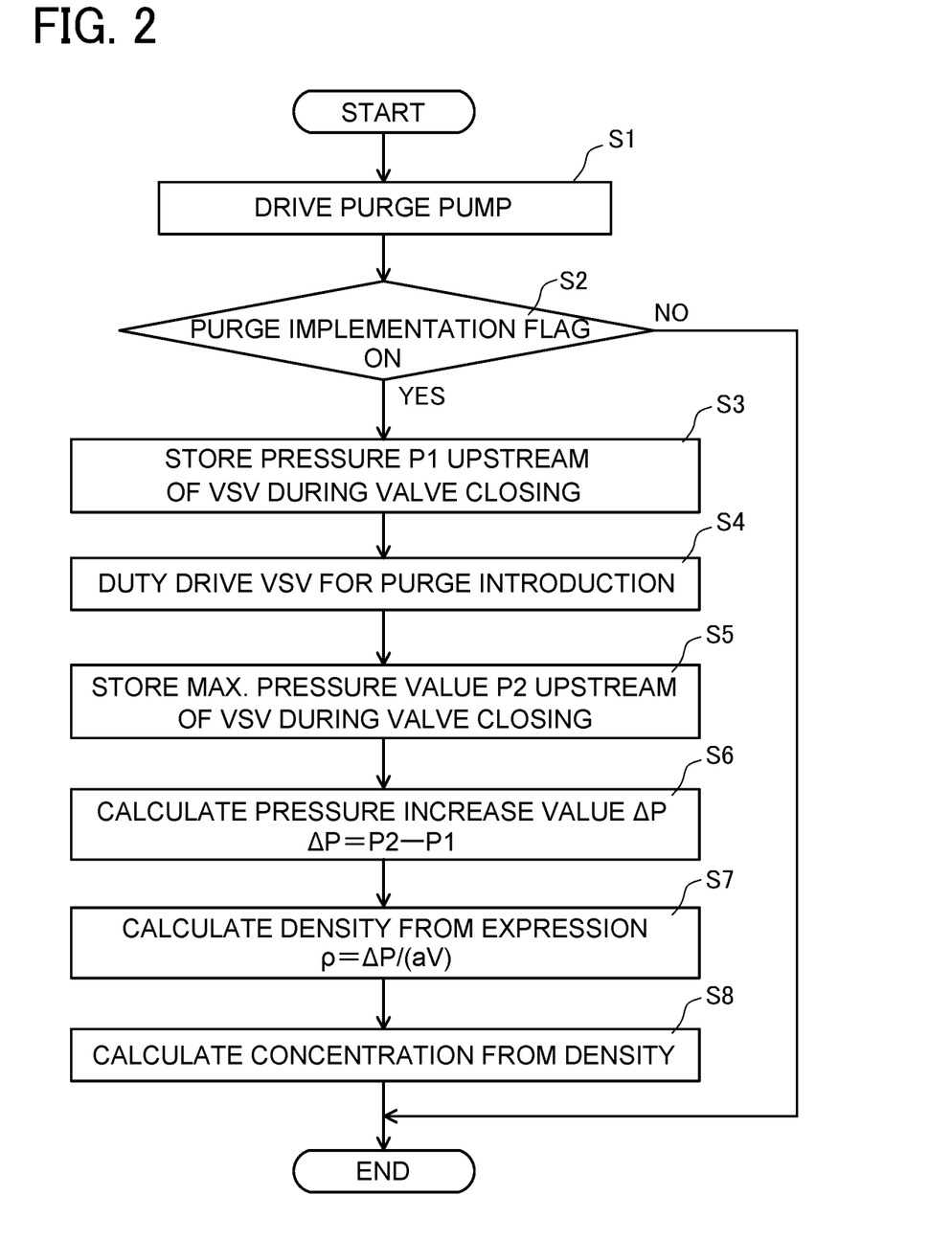
FIG. 2 is a control flow chart of a first example.

In the present example, the ECU 17 (the concentration estimation section 18) carries out the control based on a flow chart in FIG. 2.

As shown in FIG. 2, in a state in which the purge pump 13 is being driven by the ECU 17 (step S1), the concentration estimation section 18 determines whether a purge implementation flag is "ON" (step S2). In the following process, the purge pump 13 is assumed to be continuously driven.

When the purge implementation flag is "ON" and the purge condition is satisfied (step S2: YES), the concentration estimation section 18 stores a pressure value P1 during valve-closing at the first position 12a on an upstream side of the VSV 14 in the purge passage 12 (step S3). This pressure value P1 is a pressure value detected by the pressure sensor 16 under a condition that the VSV 14 is in the valve-closed state. The concentration estimation section 18 stores the pressure value P1, for example, in a memory inside the concentration estimation section 18.

Subsequently, the ECU 17 controls the VSV 14 to implement Duty drive (driving by the duty control) for introducing the purge gas into the intake passage IP by the purge control (step S4). The concentration estimation section 18 then stores a maximum pressure value P2 during valve closing at the first position 12a on the upstream side of the VSV 14 in the purge passage 12 (step S5). At this time, the concentration estimation section 18 stores the maximum pressure value P2 in a memory inside the concentration estimation section 18, for example.

Herein, the maximum pressure value P2 is a maximum pressure value when the VSV 14 is under the valve-closed state while the VSV 14 is being driven under the Duty drive to perform the valve opening and closing operation. Namely, the maximum pressure value P2 is the maximum pressure value when the VSV 14 in the valve open state is operated to close, so that the pressure wave PW generated in the purge passage 12 is propagated to the first position 12a from the VSV 14 to increase the pressure at the first position 12a that is detected by the pressure sensor 16.

Further, in the present embodiment, the ECU 17 controls a valve-closing speed of the VSV 14 (a valve's moving speed during valve closing) to be as fast as possible when the VSV 14 is under the Duty drive. Specifically, the ECU 17 controls the VSV 14 to be shifted from the valve-open state to the valve-closed state in a period of time equal to or shorter than a period of time required for the pressure wave PW, which is propagated through the purge passage 12 at sonic speed to go round between the VSV 14 and the canister 11. In other words, the ECU 17 controls the term from start to termination of valve closing of the VSV 14 to be shorter than the term of transition of the pressure wave PW propagated from the VSV 14 to the canister and reflecting on the canister 11 to finally reach at the VSV 14.

Subsequently, the concentration estimation section 18 stores the maximum pressure value P2 as mentioned above (step S5), and after that, the section 18 calculates a pressure increase value ΔP (an increase value of a first pressure) by use of the following formula (step S6). Thus, the concentration estimation section 18 obtains the pressure increase value at the first position 12a increased by the pressure wave PW generated in the purge passage 12 by the valve-closing operation of the VSV 14 based on the detected value of the pressure sensor 16.

$$\Delta P = P2 - P1 \tag{Formula 1}$$

Subsequently, the concentration estimation section 18 calculates a density ρ based on the pressure increase value ΔP calculated as above according to a relational expression indicated as a formula below adopting the pressure increase value ΔP, a sonic speed a, and a flow speed V (step S7). The sonic speed a is calculated by a state of equation of gas. The flow speed V is a flow speed of the purge gas flowing through the purge passage 12 and is calculated form a relational expression of a flow rate of the purge gas in the purge passage 12 and a passage sectional area of the purge passage 12. The flow rate of the purge gas is calculated from a rotation speed of the purge pump 13. Further, the density ρ represents a density of the purge gas flowing through the purge passage 12.

$$\rho = \Delta P / (a \times V) \tag{Formula 2}$$

Figure 3:
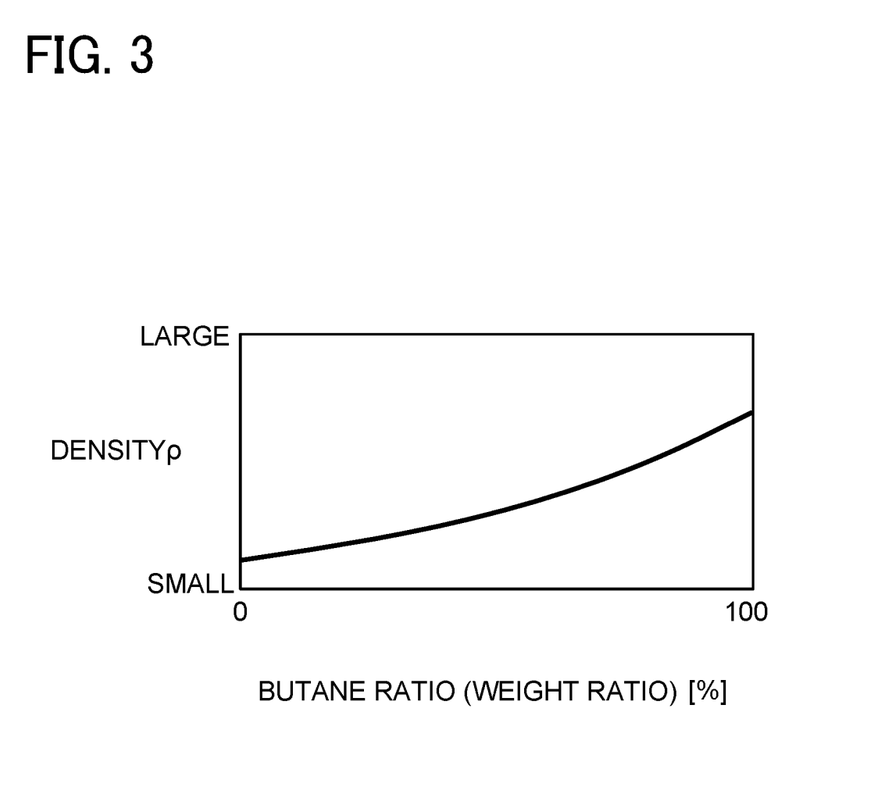
FIG. 3 is a map prescribing a relation of purge gas density and a butane ratio.

Subsequently, the concentration estimation section 18 calculates the purge concentration from the density ρ (step S8). At this time, the concentration estimation section 18 utilizes a map shown in FIG. 3, for example, to calculate a butane ratio (a weight ratio) as one example of the purge concentration by the density ρ.

As mentioned above, the ECU 17 (the concentration estimation section 18) estimates the purge concentration (herein, the butane ratio as one example).

A timing of driving the purge pump 13 is not limitative. For example, the ECU 17 may drive the purge pump 13 after the purge implementation flag turns "ON" and the purge condition has been satisfied.

Further, in the present embodiment, a passage sectional area from the canister 11 to the VSV 14 in the purge passage 12 is formed uniform. However, the form is not limited to this. For example, a pipe forming the purge passage 12, namely a pipe at least forming a part between the canister 11 to the VSV 14 in the purge passage 12 may be made of material with high hardness (such as metal) and may have a smooth surface roughness of an inner surface of the passage. This configuration also helps preventing the pressure wave PW generated in the purge passage 12 by the valve-closing operation of the VSV 14 from being attenuated when propagating through the purge passage, and also preventing reflection of the pressure wave PW on any parts other than the canister 11 as much as possible.

In a second example and the following examples, different points from the first example will be explained.

Second Example

In the present example, the concentration estimation section 18 performs correction in consideration with a valve-closing speed of the VSV 14 and/or an attenuation amount of the pressure wave PW attenuated while the pressure wave PW is propagated from the VSV 14 to the pressure sensor 16 (the first position 12a), and then estimates the purge concentration. Specifically, in the present example, the following formula adopting a correction coefficient C is used as the relational expression used in step S7 of FIG. 2.

$$\rho = C \times \Delta P / (a \times V) \tag{Formula 3}$$

Herein, the correction coefficient C is defined as a coefficient for performing correction considering the valve-closing speed of the VSV 14 which is actually provided in the purge passage 12 and an attenuation amount (the attenuation amount of the pressure wave PW attenuated by the influence of the pipe) of a pipe which actually constitutes the purge passage 12. This correction coefficient C is, for example, a value experimentally obtained according to the characteristics of the VSV 14 and the pipe which are actually provided.

Third Example

Figure 4:
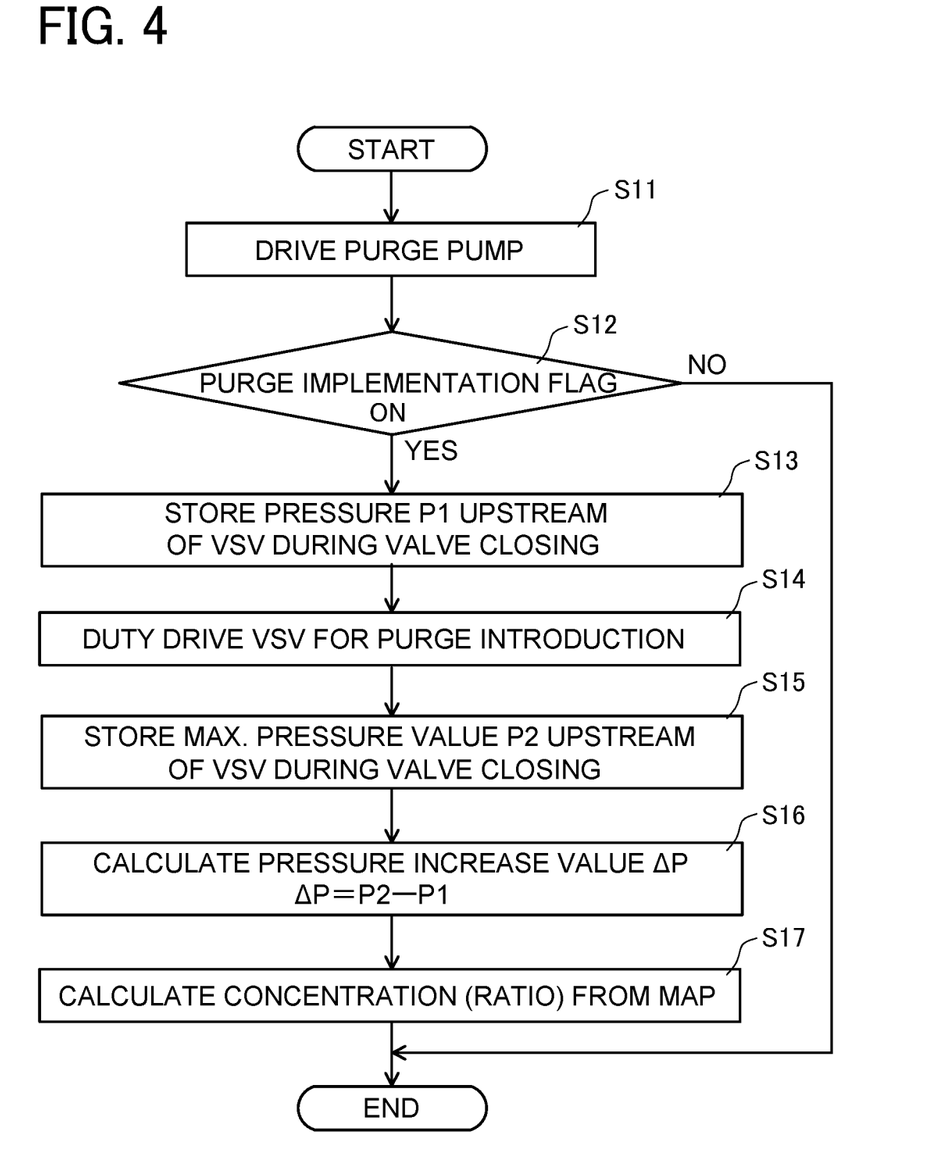
FIG. 4 is a control flow chart of a third example.

In the present example, the ECU 17 (the concentration estimation section 18) performs the control based on a flowchart of FIG. 4. As shown in FIG. 4, the present example is different from the flowchart shown in FIG. 2 in a manner that the concentration estimation section 18 of the ECU 17 calculates the purge concentration from a map prescribing the relation of the pressure increase value ΔP, the flow speed V, and the purge concentration (for example, a butane ratio) (step S17). In step S17, the concentration estimation section 18 may calculate the purge concentration (the butane ratio) according to the following formula instead of calculating the purge concentration from the map.

$$\text{Butane ratio} = 0.9138 \times V - 1 \times \Delta P - 345.33 \tag{Formula 4}$$

<Effects of Present Embodiment>

As mentioned above, in the present embodiment, the concentration estimation section 18 obtains the increase value of the pressure generated by the valve-closing operation of the VSV 14 at the first position 12a of the purge passage 12 based on the detected value of the pressure sensor 16, and based on the thus obtained increased value, estimates the purge concentration.

As mentioned above, in the present embodiment, the pressure is increased in the purge passage 12 by the valve-closing operation of the VSV 14, and the purge concentration is estimated based on the increased value of the pressure. Accordingly, the pressure sensor 16 has only to be additionally provided in the purge passage 12 as a component necessary for the evaporated fuel processing device 1 for estimating the purge concentration. Therefore, according to the evaporated fuel processing device 1 of the present embodiment, the purge concentration can be detected during the purge control by a simple device configuration, and thus cost reduction can be achieved. Moreover, based on a detection result of the purge concentration, the air-fuel ratio of the engine EN gets easy to be adjusted to the optimum air-fuel ratio, thus improving the controllability of the air-fuel ratio.

Further, in the present embodiment, the purge concentration can be instantly estimated from the increased value of the pressure in the purge passage 12 while the purge control is under implementation. Accordingly, as for correction control for the purge control, implementation of the correction control is hardly delayed, so that disturbance in the air-fuel ratio (excessive fluctuation in the air-fuel ratio) hardly occurs. The "correction control for the purge control" means control of correcting an introduction amount of the purge gas to the intake passage IP according to the purge concentration.

Further, in the present embodiment, in estimating the purge concentration, the pressure wave PW is generated in the purge passage 12 by the valve-closing operation of the VSV 14 during implementation of the purge control so that the pressure at the first position 12a is increased.

This generation of the pressure wave PW in the purge passage 12 brings about remarkable increase in the pressure at the first position 12a. Accordingly, the estimation accuracy of the purge concentration is improved.

Further, the concentration estimation section 18 may estimate the purge concentration in consideration with at least any one of the valve-closing speed of the VSV 14 and the attenuation amount of the pressure wave PW while the pressure wave PW generated in the purge passage 12 by the valve-closing operation of the VSV 14 is propagated from the VSV 14 to the pressure sensor 16.

The purge concentration can be thus estimated according to the characteristics of the VSV 14 actually provided in the evaporated fuel processing device 1 and the characteristics of the pipe actually constituting the purge passage 12. Accordingly, estimation of the purge concentration is hardly influenced by individual differences of the VSVs 14 and the pipes. Therefore, the estimation accuracy of the purge concentration is improved.

Further, in the present embodiment, the ECU 17 controls the period of time from start to termination of the valve-closing operation of the VSV 14 to be shorter than the period of time of the pressure wave PW being propagated from the VSV 14 to the canister 11 and reflected on the canister 11 to reach the VSV 14.

This increase in the valve-closing speed of the VSV 14 achieves suppression of decline in the pressure increase of the pressure wave PW at the first position 12a of the purge passage 12, the decline being caused by reflection of the pressure wave PW on the canister 11 and return to the VSV 14 before completion of closing of the VSV 14. Therefore, the estimation accuracy of the purge concentration can be further effectively improved.

Further, in the present embodiment, a passage sectional area of the purge passage 12 from the canister 11 to the VSV 14 is formed uniform. This makes it possible to suppress attenuation of the pressure wave PW during propagation through the purge passage 12 and reflection of the pressure wave PW on any parts other than the canister 11 as much as possible. Therefore, the estimation accuracy of the purge concentration can be further effectively improved.

Further, in the present embodiment, the purge pump 13 for controlling the flow of the purge gas is provided between the canister 11 and the pressure sensor 16 in the purge passage 12. Driving of this purge pump 13 can make the increase in the pressure increased by the pressure wave PW stably large. Therefore, the purge concentration can be estimated with large increase in the pressure increased by the pressure wave PW at the first position 12a, thereby improving the estimation accuracy of the purge concentration.

In estimating the purge concentration by the concentration estimation section 18, for example, it is assumed to increase the rotation speed of the purge pump 13 to increase the flow rate of the purge gas. When the flow speed V of the purge gas is increased in this manner to increase the pressure increase value ΔP, the purge concentration can be highly accurately estimated.

Further, the pressure wave PW generated in the purge passage 12 by the valve-closing operation of the VSV 14 is attenuated due to resistance inside the purge passage 12 and others as the pressure wave PW is propagated toward the canister 11. In a case that a distance between the VSV 14 and the pressure sensor 16 is long, the pressure wave PW may have been largely attenuated during propagation to the pressure sensor 16, which could cause imperfect detection of the pressure increase by the pressure sensor 16.

To address the above, in the present embodiment, a distance between the VSV 14 and the pressure sensor 16 is made such that an attenuation amount of the pressure wave PW at the time when the pressure wave PW is propagated from the VSV 14 to the purge passage 12 and then reaches the pressure sensor 16 is less than a predetermined amount (a first predetermined amount). The pressure sensor 16 is thus provided in a vicinity of the VSV 14, and therefore the attenuation amount is made small while the pressure wave PW is propagated to the pressure sensor 16. Therefore, the pressure increase increased by the pressure wave PW can be sufficiently detected by the pressure sensor 16, thus improving the estimation accuracy of the purge concentration.

When a distance between the VSV 14 and the canister 11 in the purge passage 12 is short, the pressure wave PW generated in the purge passage 12 by the valve-closing operation of the VSV 14 is less attenuated until the pressure wave PW is propagated through the purge passage 12 to reflect on the canister 11 and then returns to the VSV 14. This results in tendency of interference between another pressure wave PW newly generated in the purge passage 12 by the valve-closing operation of the VSV 14 and the pressure wave PW that has reflected on the canister 11.

To address this, in the present embodiment, the distance between the VSV 14 and the canister 11 in the purge passage 12 is arranged such that the attenuation amount of the pressure wave PW, which is propagated through the purge passage 12 from the VSV 14 to reflect on the canister 11 and returns to the VSV 14, is equal to or larger than a predetermined amount (a second predetermined amount). The distance between the VSV 14 and the canister 11 in the purge passage 12 is thus made long, so that the pressure wave PW newly generated in the purge passage 12 by the valve-closing operation of the VSV 14 and the pressure wave PW that has reflected on the canister 11 hardly interfere each other. Therefore, the pressure increase by the pressure wave PW can be accurately detected by the pressure sensor 16, thus improving the estimation accuracy of the purge concentration.

Further, this increase in the attenuation amount of the pressure wave PW that reflects on the canister 11 and then returns to the VSV 14 can achieve suppression of decline in the pressure increase at the first position 12a without arranging the period of time from start to termination of the valve-closing operation of the VSV 14 to be shorter than the period of time from reflection of the pressure wave PW on the canister 11 to reach the VSV 14.

Second Embodiment

A second embodiment will be explained with focusing on different points from the first embodiment.

Figure 5:
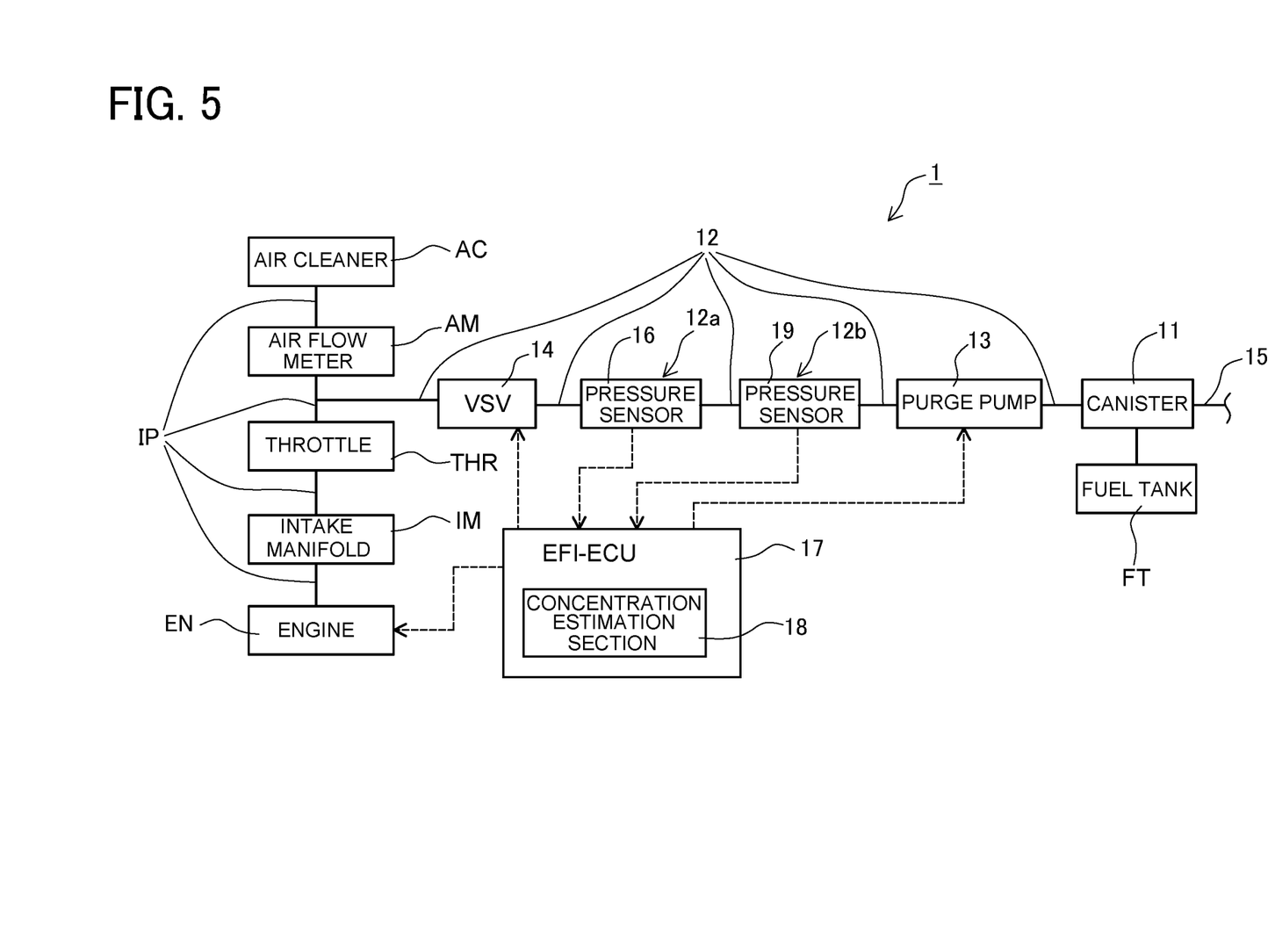
FIG. 5 is a schematic configurational view of an evaporated fuel processing device and its surroundings in a second embodiment.

In the present embodiment, as shown in FIG. 5, the evaporated fuel processing device 1 includes a pressure sensor 19 (a second pressure detection section) to detect a pressure at a second position 12b which is located closer to the canister 11 than the first position 12a provided with the pressure sensor 16 in the purge passage 12. Further, the ECU 17 obtains a detected value of the pressure at the second position 12b in the purge passage 12 from the pressure sensor 19. The concentration estimation section 18 then calculates a pressure wave propagation speed, which is a speed of the pressure wave PW being propagated, based on a period of time from detection of pressure increase by the pressure sensor 16 during the valve-closing operation of the VSV 14 to detection of the pressure increase detected by the pressure sensor 19. Subsequently, the concentration estimation section 18 estimates the purge concentration based on the increase value of the pressure generated by the valve-closing operation of the VSV 14 at the position of the pressure sensor 16 and the calculated pressure wave propagation speed.

As mentioned above, in the present embodiment, the density p can be calculated from the pressure wave propagation speed that is calculated based on the pressure values (actual values) actually detected by the pressure sensor 16 and the pressure sensor 19 instead of the sonic speed a in the above-mentioned formulas (the Formula 2 and the Formula 3). The purge concentration can be estimated by the density p that has been calculated based on the actual measured values as mentioned above, and thus the estimation accuracy of the purge concentration is further improved.

The above embodiments are only illustration and have no any limitation to the present disclosure, and they may be made with various improvements and modifications without departing from the scope of the disclosure.

For example, the concentration estimation section 18 may not be provided as a part of the ECU 17 but may be provided separately from the ECU 17. Further, the purge passage 12 may be communicated with the intake passage IP on a downstream side of the throttle valve THR. Instead of the ECU 17, a controller (not shown) provided separately from or integrally with the ECU 17 may control the evaporated fuel processing device 1. Furthermore, the purge pump 13 is not an essential component for the evaporated fuel processing device 1.

REFERENCE SIGNS LIST

1 Evaporated fuel processing device
11 Canister
12 Purge passage
12a First position
12b Second position
13 Purge pump
14 VSV
15 Atmosphere passage
16 Pressure sensor
17 ECU (EFI-ECU)
18 Concentration estimation section
19 Pressure sensor
EN Engine
IP Intake passage
IM Intake manifold
THR Throttle (throttle valve)
AC Air cleaner
AM Air flow meter
FT Fuel tank
PW Pressure wave
P1 Pressure value
P2 Maximum pressure value
ΔP Pressure increase value

The invention claimed is:

1. An evaporated fuel processing device comprising: a canister; a purge passage connected to an intake passage that is connected with an internal combustion engine and to the canister to make purge gas flow from the canister to the intake passage; and a flow rate control valve provided in the purge passage to control a flow rate of the purge gas, wherein the evaporated fuel processing device further comprises:
a first pressure detection section configured to detect a first pressure as a pressure at a first position between the canister and the flow rate control valve in the purge passage; and
a concentration estimation section configured to estimate the purge concentration as a concentration of the purge gas flowing through the purge passage,
the concentration estimation section is configured to:
obtain an increase value of the first pressure generated by valve-closing operation of the flow rate control valve based on a detected value of the first pressure detection section, and
estimate the purge concentration based on the obtained increase value of the first pressure,
the flow rate control valve is configured to be operated to close to generate a pressure wave in the purge passage so that the first pressure is increased to a maximum first pressure value during execution of purge control of introducing the purge gas from the canister to the intake passage via the purge passage, and
the increase value of the first pressure is a value obtained based on a difference between the maximum first pressure value and a previously detected first pressure value, the maximum first pressure value resulting from the pressure wave generated in the purge passage by the valve-closing operation of the flow rate control valve being propagated from the flow rate control valve to the first position.

2. The evaporated fuel processing device according to claim 1, wherein the concentration estimation section is configured to estimate the purge concentration with making a correction considering at least any one of a valve-closing speed of the flow rate control valve and an attenuation amount of the pressure wave generated in the purge passage by the valve-closing operation of the flow rate control valve while the pressure wave is propagated from the flow rate control valve to the first pressure detection section.

3. The evaporated fuel processing device according to claim 1, comprising a second pressure detection section configured to detect a second pressure as a pressure at a second position in the purge passage on a side closer to the canister than the first position, wherein
the concentration estimation section is configured to:
calculate a pressure-wave propagation speed as a speed of propagating the pressure wave generated in the purge passage by the valve-closing operation of the flow rate control valve based on a period of time from detection of increase in the first pressure by the first pressure detection section to detection of increase in the second pressure by the second pressure detection section during the valve-closing operation of the flow rate control valve; and
estimate the purge concentration based on an increase value of the first pressure and the calculated pressure-wave propagation speed.

4. The evaporated fuel processing device according to claim 1, wherein a period of time from start to termination of the valve-closing operation of the flow rate control valve is made to be shorter than a period of time of the pressure wave generated in the purge passage by the valve-closing operation of the flow rate control valve to be propagated from the flow rate control valve to the canister and reflect on the canister to reach the flow rate control valve.

5. The evaporated fuel processing device according to claim 1, wherein a passage sectional area of the purge passage from the canister to the flow rate control valve is formed uniform.

6. The evaporated fuel processing device according to claim 1, wherein a purge pump is provided to control flow of the purge gas at a position in the purge passage between the canister and the first pressure detection section.

7. An evaporated fuel processing device comprising: a canister; a purge passage connected to an intake passage that is connected with an internal combustion engine and to the canister to make purge gas flow from the canister to the intake passage; and a flow rate control valve provided in the purge passage to control a flow rate of the purge gas, wherein
the evaporated fuel processing device further comprises:
a first pressure detection section configured to detect a first pressure as a pressure at a first position between the canister and the flow rate control valve in the purge passage; and
a concentration estimation section configured to estimate the purge concentration as a concentration of the purge gas flowing through the purge passage,
the concentration estimation section is configured to:
obtain an increase value of the first pressure generated by valve-closing operation of the flow rate control valve based on a detected value of the first pressure detection section, and
estimate the purge concentration based on the obtained increase value of the first pressure, and
the concentration estimation section is configured to estimate the purge concentration with making a correction considering at least any one of a valve-closing speed of the flow rate control valve and an attenuation amount of the pressure wave generated in the purge passage by the valve-closing operation of the flow rate control valve while the pressure wave is propagated from the flow rate control valve to the first pressure detection section.

8. The evaporated fuel processing device according to claim 7, comprising a second pressure detection section configured to detect a second pressure as a pressure at a second position in the purge passage on a side closer to the canister than the first position, wherein
the concentration estimation section is configured to:
calculate a pressure-wave propagation speed as a speed of propagating the pressure wave generated in the purge passage by the valve-closing operation of the flow rate control valve based on a period of time from detection of increase in the first pressure by the first pressure detection section to detection of increase in the second pressure by the second pressure detection section during the valve-closing operation of the flow rate control valve; and
estimate the purge concentration based on an increase value of the first pressure and the calculated pressure-wave propagation speed.

9. The evaporated fuel processing device according to claim 7, wherein a period of time from start to termination of the valve-closing operation of the flow rate control valve is made to be shorter than a period of time of the pressure wave generated in the purge passage by the valve-closing operation of the flow rate control valve to be propagated from the flow rate control valve to the canister and reflect on the canister to reach the flow rate control valve.

10. The evaporated fuel processing device according to claim 7, wherein a passage sectional area of the purge passage from the canister to the flow rate control valve is formed uniform.

11. The evaporated fuel processing device according to claim 7, wherein a purge pump is provided to control flow of the purge gas at a position in the purge passage between the canister and the first pressure detection section.

12. An evaporated fuel processing device comprising: a canister; a purge passage connected to an intake passage that is connected with an internal combustion engine and to the canister to make purge gas flow from the canister to the intake passage; and a flow rate control valve provided in the purge passage to control a flow rate of the purge gas, wherein
the evaporated fuel processing device further comprises:
a first pressure detection section configured to detect a first pressure as a pressure at a first position between the canister and the flow rate control valve in the purge passage; and
a concentration estimation section configured to estimate the purge concentration as a concentration of the purge gas flowing through the purge passage,
the concentration estimation section is configured to:
obtain an increase value of the first pressure generated by valve-closing operation of the flow rate control valve based on a detected value of the first pressure detection section, and
estimate the purge concentration based on the obtained increase value of the first pressure,
the evaporated fuel processing device further comprises a second pressure detection section configured to detect a second pressure as a pressure at a second position in the purge passage on a side closer to the canister than the first position, and
the concentration estimation section is configured to:
calculate a pressure-wave propagation speed as a speed of propagating the pressure wave generated in the purge passage by the valve-closing operation of the flow rate control valve based on a period of time from detection of increase in the first pressure by the first pressure detection section to detection of increase in the second pressure by the second pressure detection section during the valve-closing operation of the flow rate control valve; and
estimate the purge concentration based on an increase value of the first pressure and the calculated pressure-wave propagation speed.

13. The evaporated fuel processing device according to claim 12, wherein a period of time from start to termination of the valve-closing operation of the flow rate control valve is made to be shorter than a period of time of the pressure wave generated in the purge passage by the valve-closing operation of the flow rate control valve to be propagated from the flow rate control valve to the canister and reflect on the canister to reach the flow rate control valve.

14. The evaporated fuel processing device according to claim 12, wherein a passage sectional area of the purge passage from the canister to the flow rate control valve is formed uniform.

15. The evaporated fuel processing device according to claim 12, wherein a purge pump is provided to control flow of the purge gas at a position in the purge passage between the canister and the first pressure detection section.

16. An evaporated fuel processing device comprising: a canister; a purge passage connected to an intake passage that is connected with an internal combustion engine and to the canister to make purge gas flow from the canister to the intake passage; and a flow rate control valve provided in the purge passage to control a flow rate of the purge gas, wherein the evaporated fuel processing device further comprises:
a first pressure detection section configured to detect a first pressure as a pressure at a first position between the canister and the flow rate control valve in the purge passage; and
a concentration estimation section configured to estimate the purge concentration as a concentration of the purge gas flowing through the purge passage,
the concentration estimation section is configured to:
obtain an increase value of the first pressure generated by valve-closing operation of the flow rate control valve based on a detected value of the first pressure detection section, and
estimate the purge concentration based on the obtained increase value of the first pressure, and
a period of time from start to termination of the valve-closing operation of the flow rate control valve is made to be shorter than a period of time of the pressure wave generated in the purge passage by the valve-closing operation of the flow rate control valve to be propagated from the flow rate control valve to the canister and reflect on the canister to reach the flow rate control valve.

* * * * *